United States Patent
Nachtman et al.

(10) Patent No.: US 6,806,298 B1
(45) Date of Patent: Oct. 19, 2004

(54) SPRAYABLE COMPOSITION AND METHOD FOR FORMING A FOAMED OUTDOOR PROTECTIVE COVER LAYER

(75) Inventors: Thomas J. Nachtman, Temperance, MI (US); John H. Hull, Toledo, OH (US); Patrick O'Shea, Hanover, MI (US)

(73) Assignee: New Waste Concepts, Inc., Perrysburg, OH (US)

( * ) Notice: Subject to any disclaimer, the term of this patent is extended or adjusted under 35 U.S.C. 154(b) by 113 days.

(21) Appl. No.: 09/626,684

(22) Filed: Jul. 27, 2000

(Under 37 CFR 1.47)

Related U.S. Application Data

(60) Division of application No. 08/685,202, filed on Jul. 23, 1996, now Pat. No. 6,096,373, which is a division of application No. 08/353,954, filed on Dec. 12, 1994, now Pat. No. 5,556,033, which is a continuation of application No. 08/003,633, filed on Jan. 13, 1993, now abandoned, which is a continuation-in-part of application No. 07/823,186, filed on Jan. 21, 1992, now abandoned, which is a continuation of application No. 07/639,285, filed on Jan. 10, 1991, now Pat. No. 5,082,500, which is a continuation-in-part of application No. 07/350,599, filed on May 10, 1989, now abandoned.

(51) Int. Cl.$^7$ .................................................. C08J 9/04
(52) U.S. Cl. ...................... 521/99; 106/122; 106/672; 106/674; 106/680; 106/711; 106/805; 521/83; 521/84.1; 521/100; 521/122; 521/123; 521/149

(58) Field of Search ................................. 521/84.1, 149, 521/83, 99, 100, 122, 123; 106/122, 672, 674, 680, 711, 805

(56) References Cited

U.S. PATENT DOCUMENTS

| | | | | |
|---|---|---|---|---|
| 3,834,918 A | * | 9/1974 | Uegaeshi et al. | 106/122 |
| 4,871,395 A | * | 10/1989 | Sugama | 106/677 |
| 5,109,030 A | * | 4/1992 | Chao et al. | 521/149 |
| 5,110,839 A | * | 5/1992 | Chao | 521/149 |
| 5,161,915 A | * | 11/1992 | Hansen | 405/129.9 |

* cited by examiner

Primary Examiner—John M. Cooney, Jr.
(74) Attorney, Agent, or Firm—MacMillan, Sobanski & Todd, LLC

(57) ABSTRACT

A sprayable composition and a method of protecting material with the composition is disclosed. The composition comprises a bulking/setting material, a water soluble polymer and water to provide a cover layer which, after spraying, is tough, flexible and water-repellent. Other materials such as clay, fibrous material, a foam producing agent and a hardening retarder can be included in the composition. The composition is effective as a cover layer over material such as soil, refuse at a dump site, stockpiled material, a temporary cover for remediation sites, or tire piles.

2 Claims, 3 Drawing Sheets

SPRAYABLE COMPOSITION AND METHOD FOR FORMING A FOAMED OUTDOOR PROTECTIVE COVER LAYER

CROSS REFERENCE TO RELATED APPLICATIONS

This application is a divisional of U.S. application Ser. No. 08/685,202, filed Jul. 23, 1996, now U.S. Pat. No. 6,096,373, which is a divisional of U.S. application Ser. No. 08/353,954, filed Dec. 12, 1994, now U.S. Pat. No. 5,556,033, which is a continuation of U.S. application Ser. No. 08/003,633, filed Jan. 13, 1993, now abandoned, which is a continuation-in-part of U.S. application Ser. No. 07/823,186, filed Jan. 21, 1992, now abandoned, which is a continuation of U.S. application Ser. No. 07/639,285, filed Jan. 10, 1991, now U.S. Pat. No. 5,082,500, which is a continuation-in-part of U.S. application Ser. No. 07/350,599, filed May 10, 1989, now abandoned.

BACKGROUND OF THE INVENTION

The present invention relates to a sprayable foamed composition, and to a method of spraying the composition for covering a material to be protected such as soil, refuse at a disposal site, or other material in a stockpile to form a protective water-resistant layer thereover.

It is common in landfill or dump operations which receive garbage, trash and/or other deposits during the day to provide a covering layer of compacted earth approximately six inches to two feet deep at the end of the day. This earth layer prevents the escape of odors, the blowing of papers and other trash into the adjacent area, the proliferation of pests such as flies, rodents, and birds, and the leaching of toxic or disagreeable components from the dumped material. This cover material provision, often termed "daily cover", is frequently required by municipal, state, and/or federal regulations which govern such landfill or dump operations.

The task of placing and compacting an earth "daily cover" represents a very significant portion of the landfill operating cost since it employs significant labor and heavy equipment. Such compacted earth cover performs its principle function only for a day or so, that is, each day's garbage or trash layer is covered at the end of the day and further garbage and trash layers are then piled directly on top of the previous day's "daily cover".

Besides the cost of applying the compacted earth cover, it is recognized that multiple earth fill layers used in this way consume a significant volume of the valuable landfill space, which might otherwise be used for disposal. Many areas are rapidly exhausting their available landfill acreage and reducing the consumption rate of the available landfill volume is, accordingly, desirable.

One solution to the provision of such compacted earth cover has been proposed and described in U.S. Pat. Nos. 4,421,788 and 4,519,338 in which means are disclosed for coating the landfill surface with a non-biodegradable plastic foam spray which, in effect, provides the "daily cover". An alternate solution to this problem is disclosed in U.S. Pat. Nos. 4,909,667 and 4,927,317 wherein a canvas or plastic sheet is daily retracted and extended to protect the working face of the disposal site.

Sprayable compositions have also been proposed for agricultural and erosion control purposes. U.S. Pat. No. 2,802,303 discloses a soil surface treatment utilizing a mixture of a water-soluble cellulose derivative and a finely divided expanding lattice clay for control of natural wind and water erosion of surface soil. The mixture can be applied dry to the soil surface being treated or injected into a stream of water to form a slurry which is sprayed onto the surface.

U.S. Pat. No. 3,763,072 discloses a method of forming a relatively thick semi-impervious crust on soil to inhibit erosion, or in hydroseeding applications to apply seed, fertilizer, herbicide and fibrous mulch. The method includes the step of spraying an aqueous composition onto the soil surface and allowing the composition to cure in the treated soil surface. The aqueous composition contains an aqueous 100% latex emulsion (for binding soil particles together) and sodium silicate (to assist the composition in penetrating into the soil to prevent the formation of a mere surface layer).

U.S. Pat. No. 2,961,799 discloses a sprayable latex composition for treating soil which forms a surface film intimately bonded to the soil particles. The composition includes a water-insoluble counter-penetrant (which inhibits soil penetration by the rubber, and is absorbed preferably by the soil).

Another method for inhibiting erosion and applying seed to a soil surface is disclosed in U.S. Pat. No. 3,600,852, wherein an aqueous slurry consisting mainly of gypsum (as a binder material) and a minor amount of seed is sprayed over a soil surface. The slurry can also contain minor amounts of fertilizer, high bulking water-absorbing filler materials such as cellulosic fibers to facilitate germination, and a set retarder to lengthen the setting time. Foaming agents may also be used.

Other sprayable or extrudable agricultural mulches are disclosed in U.S. Pat. Nos. 3,812,615 and 4,297,810.

Other soil sealing methods which require the composition to be mixed with the top layer of soil to provide a water holding area are disclosed in U.S. Pat. Nos. 3,772,893 and 3,986,365.

SUMMARY OF THE INVENTION

The present invention provides a sprayable composition for forming an outdoor cover layer over material to be protected such as, for example, (1) soil, (2) refuse at a disposal site, a sanitary landfill, or hazardous material landfill, (3) a stockpile of material such as grain, ash pits, salt or coal, (4) a temporary cover for remediation sites, or (5) tire piles (which may optionally be covered with a netting material before spraying the composition). When used over soil, the composition can function as a means of providing erosion control and/or a means for distributing seed and fertilizer over the soil. The cover layer so formed remains intact for up to 6 to 12 months and then biodegrades.

The composition includes the following ingredients:
(a) a major amount of a bulking/setting material, such as gypsum or fly ash, for example;
(b) one or more water soluble polymers, such as a cellulosic polymer or a super absorbent polymer, for providing the composition with the desired film forming, gelling and/or adhesive properties; and
(c) a carrier such as water for the bulking/setting material and the polymer such that the composition, after spraying, becomes water-resistant, tough and flexible.

Preferably, the composition also includes a foaming agent to extend the coverage of the composition and enhance the ability of the composition to adhere to sloping and vertical surfaces.

The above composition can also include a clay, such as bentonite, as a non-shrinking inert filler. Furthermore, a fibrous material, such as paper and/or wood fiber, can be added to the composition as a filler and a binder for a matrix formed by the polymer.

A retarder can be included in the above composition to slow the hardening of the bulking/setting agent to allow preparation of larger batches at one time.

Other ingredients can be advantageously added to the composition such as one or more of the following additives: an anti-dusting agent, a dye, and an odor control agent. For planting applications, seed and fertilizer can be added.

The ingredients are combined with the water carrier to form an aqueous slurry which is sprayed or spread by other means over the surface being treated.

The present invention also provides a preferred method of using the above described sprayable composition to form a cover layer over material, the method comprising:

(a) mixing the above ingredients in effective proportions to produce a foamed sprayable slurry;

(b) spraying the foamed slurry at ambient temperature over the material to form a layer of thickness sufficient to cover and protect the top of the material for a predetermined period of time; and (c) protecting the material by allowing the layer to set up and form a water-resistant, tough and flexible cover layer.

The composition, when sprayed, forms a protective, water-resistant covering layer over material, which has been found to last up to six months to a year, depending upon the ambient weather conditions. The resulting covering layer has the following advantages:

1) easily sprayed at ambient temperature;

2) does not mist in the air when sprayed;

3) tacks down dust or papers that are blown unwantedly by wind;

4) becomes water-resistant when cured and set up after spraying;

5) resists cracking even in hot temperatures including temperatures above 100° F.;

6) after setting up, the sprayed layer has decreased surface penetration by precipitation;

7) reduces volatile emissions and controls odor.

In addition, the present invention concerns an apparatus for foaming and spraying the above composition. The apparatus includes means for ensuring the foaming agent is thoroughly blended in the composition before spraying.

Other advantages of the present invention will be apparent to one skilled in the art from reading the following description of the preferred embodiment.

DETAILED DESCRIPTION OF THE INVENTION

Figure 1:
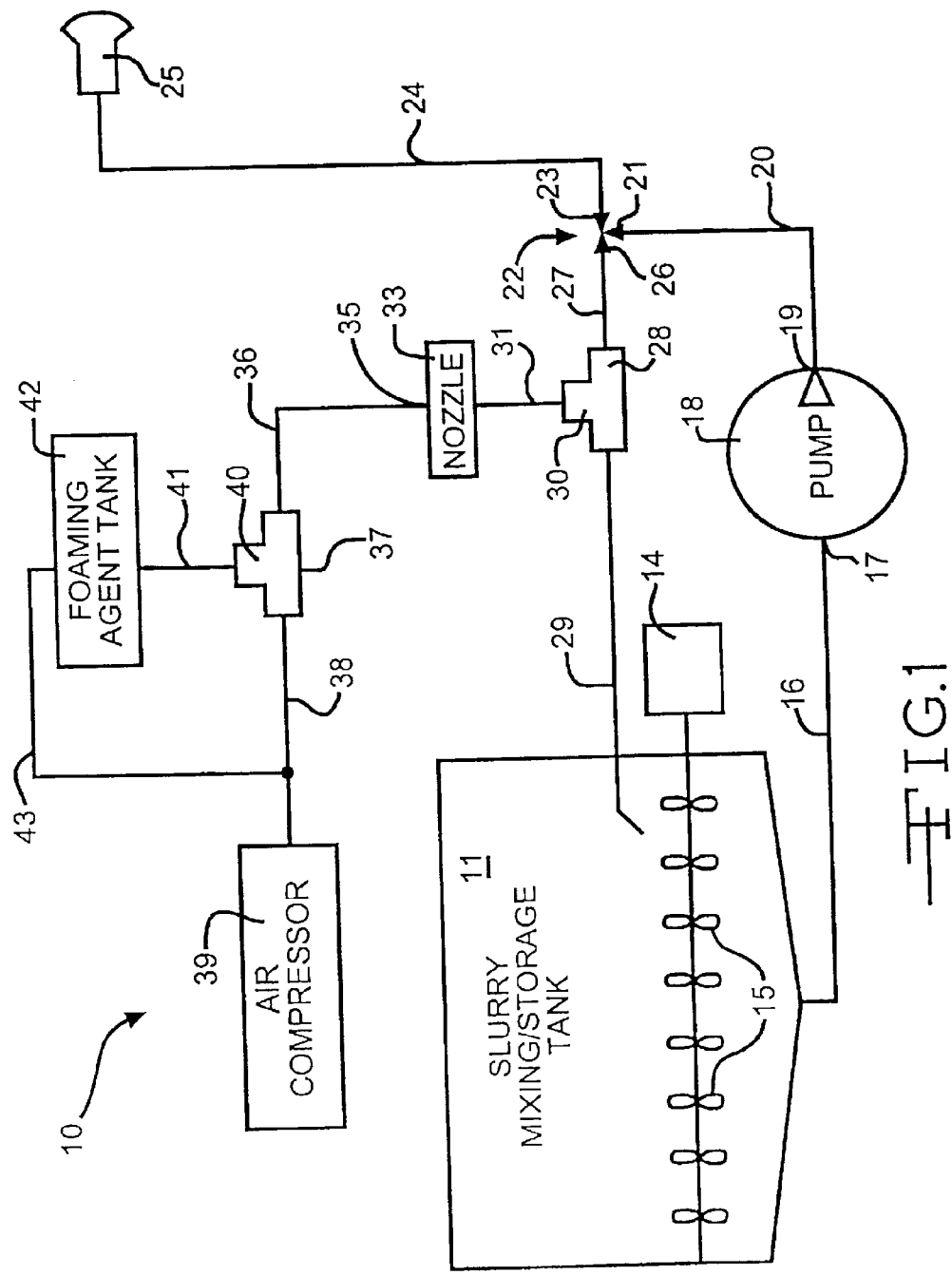
FIG. 1 is a schematic diagram of an apparatus for preparing and applying the foamed covering in accordance with the invention.

Referring now to the following Example 1, there is provided a listing of ingredients included in a sprayable composition for forming a cover according to the invention. The ingredients are given in pounds per 100 gallons of water. As is described below, the ingredients are mixed with water to form an aqueous slurry for a sprayed application. It is preferred to foam the slurry prior to application.

EXAMPLE 1

| Ingredient | Quantity |
| --- | --- |
| Bulking/Setting Material | 150 to 1300 pounds |
| Water Soluable Polymer | 0.5 to 20 pounds |
| Water | 100 gallons |

Examples of particular bulking/setting materials which have been effectively tested, and for which specific examples are given below, include gypsum (calcium sulfate) and fly ash. With gypsum, typically the amount used is in the range of 150 to 350 pounds (per 100 gallons), and preferably between 250 and 300 pounds. With fly ash of the reactive type (which is preferred-over the nonreactive type), typically 200 to 1200 pounds are used, and preferably between 500 and 900 pounds. With fly ash of the nonreactive type, larger amounts can be used, such as typically between 600 and 1400 pounds, and preferably between 800 to 1200 pounds. Other bulking/setting materials can be used in large amounts similar to the above. For example, lime (calcium oxide), cement, pot ash, silicates such as water glass, cement kiln dust, Portland stone, dolomite, marble, chalk, and other similar materials can be effectively utilized.

The bulking/setting material is the major ingredient of the resulting cover. After being mixed with the other ingredients and water, this material hardens, or "sets", independent of the surrounding conditions, which gives the resulting covering a natural drying advantage over other types of coverings. The hardened material is water resistant and functions to preserve the cover. The hardening of the bulking/setting material will occur under conditions of inclement weather. Covers have been successfully applied during light to moderate precipitation. The hardening of the bulking/setting material also occurs independently from the ambient temperature.

A gypsum which has been successfully used is a hemihydrated calcium sulfate, commonly known as #1 Molding Plaster, and available from U.S. Gypsum in Chicago, Ill. A preferred flyash is a low sulfur coal derived flyash from process flue gas.

One or more water soluable polymers are used in the composition. The polymers are selected to provide dust control, increase foam height integrity, increase water resistance, increase adhesion, provide structural integrity, allow "wet" setting, increase resistance to cracking, and to help the sprayed composition to bridge voids.

One preferred type of polymer is a cellulosic polymer. The cellulosic polymer is water soluble and binds together the covering by extending long polymer chains therethrough when wetted. One water soluble cellulosic polymer which has been successfully used in the composition is hydroxyethyl cellulose (HEC) polymer. The HEC polymer includes naturally occurring or synthetically produced repeating glucose units in long chains with hydrophilic substituent groups added to the polysaccharide chain to render the polymer miscible. In non-hydrated form, the polymer chains are folded into a pleated structure to form a very compact particle. In the presence of water, the polymer molecules bind with water molecules and the polymer chains unfold to form macromolecules which greatly exceed the original molecule size. Preferably, the HEC is an R treated type with a surface coating to slow the rate of molecule hydration to allow complete unfolding of the polymer chains. When the matrix is dry, the polymer chains provide strength and cohesion to the covering. The HEC polymer also increases the water resistance of covering, thereby (at least in the case of gypsum) decreasing the amount of bulking/setting material needed. The extended polymer chains would naturally refold as the covering dries, but are prevented from doing so due to the intertwining of the chains with the other ingredients of the composition.

A preferred HEC Polymer is Natrosol HHR-250, available from Hercules Inc. of Wilmington, Del., as are other Natrosol 250 polymers as well as Natrosol 150 and 300 polymers. Natrosol is produced in four levels of hydroxyethyl molar substitutes; 1.5, 1.8, 2.5 and 3.0, the polymers being designated 150, 180, 250 and 300, respectively.

Another water soluble polymer, such as a carboxymethyl cellulose (CMC) polymer, can be mixed with the HEC polymer. CMC is similar to the HEC polymer, but includes different hydrophilic substituent groups which both render the molecules water hydratable and cause the resulting molecules and polymer chains to be sticky or tacky. Thus, the CMC polymer causes the slurry to adhere to the surface being covered. This allows covering of slopes and generally vertical surfaces. The CMC bonding chain links are shorter but have a higher number in a specific area than the HEC polymer. The CMC polymer is also preferably an R treated type with a surface coating to slow the rate of hydration to allow complete unfolding of the polymer chains as macromolecules are formed. As the chains unfold, they become intertwined with the other ingredients of the composition. Similar to the HEC polymer, the chains would naturally refold as the covering dries, but are prevented from doing so due to the intertwining with the other composition ingredients.

Preferred CMC polymers are Culminal MC 25 and MC 60 which are available from the Aqualon Company, of Wilmington, Del. As an alternative (or in addition) to the CMC polymer, guar gum can be added in small amounted to increase adhesion properties.

When both the HEC and CMC polymers are used, the HEC polymer primarily functions as a binder for the covering while the CMC polymer primarily imparts adhesiveness to the composition. When used together with gypsum, typically the amount of HEC polymer is equal to or slightly greater than the amount of CMC polymer.

A further type of polymer which has been effectively used (particularly with fly ash) is a superabsorbent polymer such as a starch grafted sodium polyacrylate. This type of polymer will hydrate with water to cause sufficient thickening of the slurry to the extent necessary to suspend the other ingredients to a uniform consistency.

Water forms the greatest part of the aqueous slurry, being approximately 65 to 85 percent of the slurry by weight. Water functions as the carrier for the ingredients and provides the mixing medium for combining the ingredients. As explained above, the water combines with the polymers to extend the binding chains. Once the slurry is applied, the majority of the water leaves the covering by evaporation or leachate action. Only a small portion of the water is retained in the covering.

While the carrier used herein is preferably water, it has been found desirable in some instances to use a carrier other than water, as disclosed in U.S. Pat. No. 5,082,500, all of which is herein incorporated by reference. For example, if the cover is to be applied to a refuse site containing organic material, the leachate which is collected at the site can be used as a carrier for the ingredients. It is believed that recycling the leachate into the site will enhance the natural bacterial action which acts to reduce the volume of the organic material, while also eliminating the need to transport the leachate to a treatment plant.

Other ingredients can advantageously be added to the composition, such as clay, fibrous material, a foaming agent, a retarder, an antidust agent, a dye, or an odor control agent.

One or more types of clay can be included in the composition as a bulking aid which provides an inert filler for the cover. In addition, the clay assists the polymer in absorbing water and allowing the bulking/setting material to "wet set". The clay further increases the foam integrity, and adds color to the composition. As known in the art, clay comprises a group of crystalline, finely divided earthy materials generally considered to be hydrates of alumina and silica, with iron oxide and magnesia as common minor components.

The preferred clay ingredient of the composition is a bentonite clay, typically used in the range of 10 to 75 pounds (per 100 gallons of water) and preferably about 10 to 50 pounds. However, kaolin, attapulgite and montmorillonite clays also can be used. Other suitable clays are set forth in an IMV bulletin entitled MVITONE TM organoclays and clay products, Bentonite-Hectorite-Saponite-Sepcolite. Suitable clays have relatively small particle sizes, being in the range of 60 to 325 mesh size. Bentonite particle size is determined during crushing of the clay. The particles do not break down into smaller. particles during mixing of the solution. A suitable bentonite clay has a mesh size of 200 mesh and is available from NL Bariod Supplies.

A small amount of attipugite clay can be combined with the bentonite to provide thickening of the aqueous slurry. Typically, 1 to 15 pounds (and preferably about 2 to 10 pounds) of attipugite are added per 100 gallons of water. When the aqueous slurry is foamed, as will be described below, the attipugite provides a gelling aid to add stability to the foamed slurry allowing the slurry to bridge and not collapse upon itself. Typical types of attipugite clay which have been successfully used include hectorite, saponite and sepcolite, all of which can be obtained from NL Bariod Supplies.

The fibrous material provides additional non-shrinking filler and a binder for the polymer matrix which adds mass and toughness to the resulting covering, and helps the covering bridge voids. Typically, about 25 to 125 pounds of fibrous material are added, and preferably about 60 to 90 pounds.

The fibrous material preferably comprises cellulose fibers, such as shredded paper formed from recycled newspapers. However, any small particles of paper including cardboard bag house material can be used. Under the mechanical agitation of the mixing process (described below), the paper fiber is loosened to form smaller fiber sizes of a random nature. Thus, any small grind of recycled newsprint will be satisfactory.

Wood fiber formed from shredding wood scraps and recycled wood products can also be used as an alternative in addition to the paper fibers. The individual wood fibers are much longer in length than in diameter. The edges of the wood fibers include microscopic hooks formed by the shredding process. The hooks function to engage the other fibers and polymer chains.

Other sources of the fibrous material include fibers formed from rice paper, straw and textile fibers such as cotton linens. A combination of the various fibrous materials has been successfully used in the composition. With respect to the non-paper fibrous materials, it is preferred that the fibers are short in length and thin in diameter, having a maximum length of approximately 1 inch and an average diameter of less than approximately 1 inch.

As described above, it is preferred to include a foaming agent in the composition to produce a foamed slurry. The foaming agent functions to expand the slurry by entraining air therein. The resulting foamed slurry has a lowered density which both helps adhesion and lowers the cost of the coating. The foamed slurry also contains a higher dispersion of the ingredients to produce a more uniform and consistent coating. Foaming agents are typically liquid, and, as described below, from one quart to two gallons of a foaming agent per 100 gallons of water has been successfully used to form a foamed slurry.

Preferred foaming agents include Merle. 3005, which is available from The Mearl Corporation of Roselle Park, N.J., or Foam X, which is available from ChemTech of Canton, Ohio, as a foaming agent.

In order to utilize larger volumes of slurry, a retarder can be included to slow the hardening of the bulking/setting material to allow adequate time for mixing and spraying the larger volume of slurry before the slurry hardens. With either gypsum or flyash, it has been found that from 0.1 to 1.0 pound of a retarder (such as sodium citrate) per 100 gallons of water sufficiently delays the hardening of the bulking/setting material to allow coverage of a large surface area with a single batch of slurry.

An anti-dust agent can be included to control dusting when the dry ingredients are being added to the water carrier. From one to five pounds of anti-dust agent added to the ingredients shown in the above tables has been found to be workable. It is preferred to use from 0.1 to 5 pounds of anti-dust agent per 100 gallons of water with about 0.5 pounds being preferred. A preferred anti-dust agent is a blend of propylene glycol and N-60 Surfactant in a 9 to 1 ratio. Propylene glycol is a common industrial solvent. Both the glycol and surfactant are available from TAG Chemical in Lakewood, Ohio.

A colorant such as a dye can be included in the slurry to add an aesthetic quality of color. Proper selection and use of a color can cause the cover to blend in with the natural setting, thereby drawing less attention to the operation. Both brown and green alkali/acid based dyes have been used successfully.

In addition, when the cover is applied to a refuse site, an odor control agent can be added to the slurry.

A preferred formulation of the protective cover which utilizes gypsum includes the following ingredients, as shown in the following Example 2:

EXAMPLE 2

| Ingredient | Quantity |
| --- | --- |
| Gypsum | 200 to 350 pounds |
| Cellulosic Polymer | 1 to 20 pounds |
| Clay | 2 to 40 pounds |
| Fibrous Material | 50 to 100 pounds |
| Water | 100 gallons |

A very effective formulation of the composition includes the following ingredients, as shown in the following Example 3:

EXAMPLE 3

| Ingredient | Quantity |
| --- | --- |
| Gypsum | 250 to 300 pounds |
| Cellulosic Polymer | 2 to 10 pounds |
| Clay | 20 to 35 pounds |
| Fibrous Material | 60 to 80 pounds |
| Retarder | 0.1 to 0.5 pounds |
| Foaming Agent | 1 qt. to 2 gallons |
| Water | 100 gallons |

A preferred formulation of the protective cover which utilizes reactive type fly ash includes the following ingredients, as shown in the following Example 4:

EXAMPLE 4

| Ingredient | Quantity |
| --- | --- |
| Reactive Flyash | 400 to 1200 pounds |
| Cellulosic Polymer | 0 to 5 pounds |
| Superabsorbant Polymer | 0.1 to 5 pounds |
| Clay | 5 to 100 pounds |
| Fibrous Material | 0 to 100 pounds |
| Water | 100 gallons |

A very effective formulation of the reactive fly ash composition includes the following ingredients, as shown in the following Example 5:

EXAMPLE 5

| Ingredient | Quantity |
| --- | --- |
| Reactive Flyash | 600 to 1200 pounds |
| Cellulosic Polymer | 0 to 3 pounds |
| Superabsorbant Polymer | 0.5 to 3 pounds |
| Clay | 40 to 60 pounds |
| Fibrous Material | 0 to 100 pounds |
| Retarder | 0.3 to 0.7 pounds |
| Foaming Agent | 1 qt. to 2 gallons |
| Water | 100 gallons |

In the above examples, a cellulosic polymer (such as CMC) is used when increased adhesion properties are required. Also, when a large amount of flyash (e.g. 1200 pounds) is used, typically little or no fibrous material is required.

If nonreactive flyash is used, for the above Examples 4 and 5, typically about 200 to 300 additional pounds are required per 100 gallons of water. In this case, it has been desirable to use both HEC and CMC cellulosic polymer.

The above listed ingredients are mixed with the water on site, typically in a portable apparatus as shown schematically in FIG. 1 at 10. The apparatus 10 has a slurry mixing and storage tank 11. A variable speed mixer 14 fitted with multiple, medium pitched mixing paddles 15 is mounted upon the tank 11 for mixing the tank contents.

A pump inlet line 16 connects the tank 11 to an inlet 17 of a hydraulic pump 18. Positive displacement sludge pumps having 100 to 150 psi output pressure have been successfully used for the hydraulic pump 18.

The pump 18 has an outlet 19 connected through a pump discharge line 20 to an inlet port 21 of a three-way two position recirculation valve 22. The recirculation valve 22 has a first outlet port 23 connected through a discharge line 24 to a spray cannon 25 and a second outlet port 26 connected through an intermediate line 27 to a first injection fitting 28. The first injection fitting 28 discharges through a recirculation line 29 into the tank 11 in close proximity to the mixing paddles 15.

The first injection fitting 28 has an injection port 30 connected by a foam discharge line 31 to an outlet port 32 of a foam nozzle 33. The foam nozzle 33 has an inlet port 35 connected by a foam intermediate line 36 to the discharge of a second injection fitting 37. The second injection fitting 37 receives compressed air through a first air line 38 from an air compressor 39. The second injection fitting 37 has an injection port 40 connected through a supply line 41 to a pressure tank 42. The pressure tank 42 contains liquid foaming agent and is pressurized by compressed air supplied through a second air line 43 which branches from the first air line 38.

The entire apparatus 10 is typically mounted upon a trailer (not shown) for towing to the work site. A mixing and storage tank 11 having a 1700 gallon capacity has been successfully used in this manner, although smaller tanks also have been used. The spray cannon 25 can be mounted upon a platform (not shown) attached to the top of the tank 11 to provide maximum coverage of the surface being sprayed. Spraying distances of 75 to 200 feet have been successfully achieved with the apparatus 10. A hose on a reel and a small nozzle (not shown) can also be included with the apparatus 10 for covering small areas.

To use the apparatus 10, the required amount of water is first added to the tank 11. The tank 11 is not completely filled, leaving an empty space to receive the volume increase when the slurry is foamed. With the mixer 14 operating at high speed, the appropriate amount of ingredients listed above are fed into the tank 11. The high mixer speed is required because the ingredients do not bond chemically, but are held together in a matrix bound by polymer chains. High shear mixing, as provided by the paddles 15 when rotated at high speed, is required for proper matrix formation. The ingredients are mixed by the paddles 15 with the water for several minutes until an uniform slurry is formed.

If fibrous material is used, an additional 10 minutes of mixing is typically needed to throughly coat the fibrous material with the slurry. If paper fibers are used, the mixing further reduces the size of the fibers.

The recirculation valve 22 is positioned to discharge through the second outlet port 26 and the pump 18 started to recirculate the slurry through the injection fitting 28 and back into the tank 11. The recirculation continually agitates the slurry to assure through mixing and slow the hardening thereof.

The slurry is foamed by injecting foam into the slurry stream through the first injection fitting 28. The air compressor 39 is started to supply compressed air through lines 38 and 43 to the pressure tank. The compressed air pressurizes the pressure tank 42, forcing liquid foaming agent through the supply line 41 and into the second injection fitting 37. The second injection fitting 37 injects the liquid foaming agent into the compressed air flowing through the first air line 38. The combined foaming agent and compressed air passes through the foam intermediate line 36 and into the foam nozzle 33 to generate foam. The foam flows through the foam discharge line 31 to the first injection fitting 28 which injects the foam into the stream of slurry to form foamed slurry. The foamed slurry is returned to the tank 11 through the recirculation line 29. The mixing paddles 15 blend the foamed slurry into the unfoamed slurry, decreasing the density of the mixture while increasing the volume thereof. Blending is assured by the discharge of the recirculation line 29 being located near the mixing paddles 15.

Foam continues to be added to the slurry until the desired density of foamed slurry is formed. Typically, a ratio of one part of nonfoamed slurry to three parts of foamed slurry is used to form a cover. Thus, 300 gallons of nonfoamed slurry is combined with foam to produce 900 gallons of foamed slurry for application. Successful covers have also been formed using ratios of foamed to nonfoamed slurry of 1 to 1, 1 to 2 and 1 to 5.

Once the foamed slurry reaches the desired density, the recirculation valve 22 is positioned to discharge through the first outlet port 23, causing the foamed slurry to be pumped through the discharge line 24 to the spray cannon 25. The spray cannon 25 sprays the foamed slurry onto the surface being coated.

Figure 2:
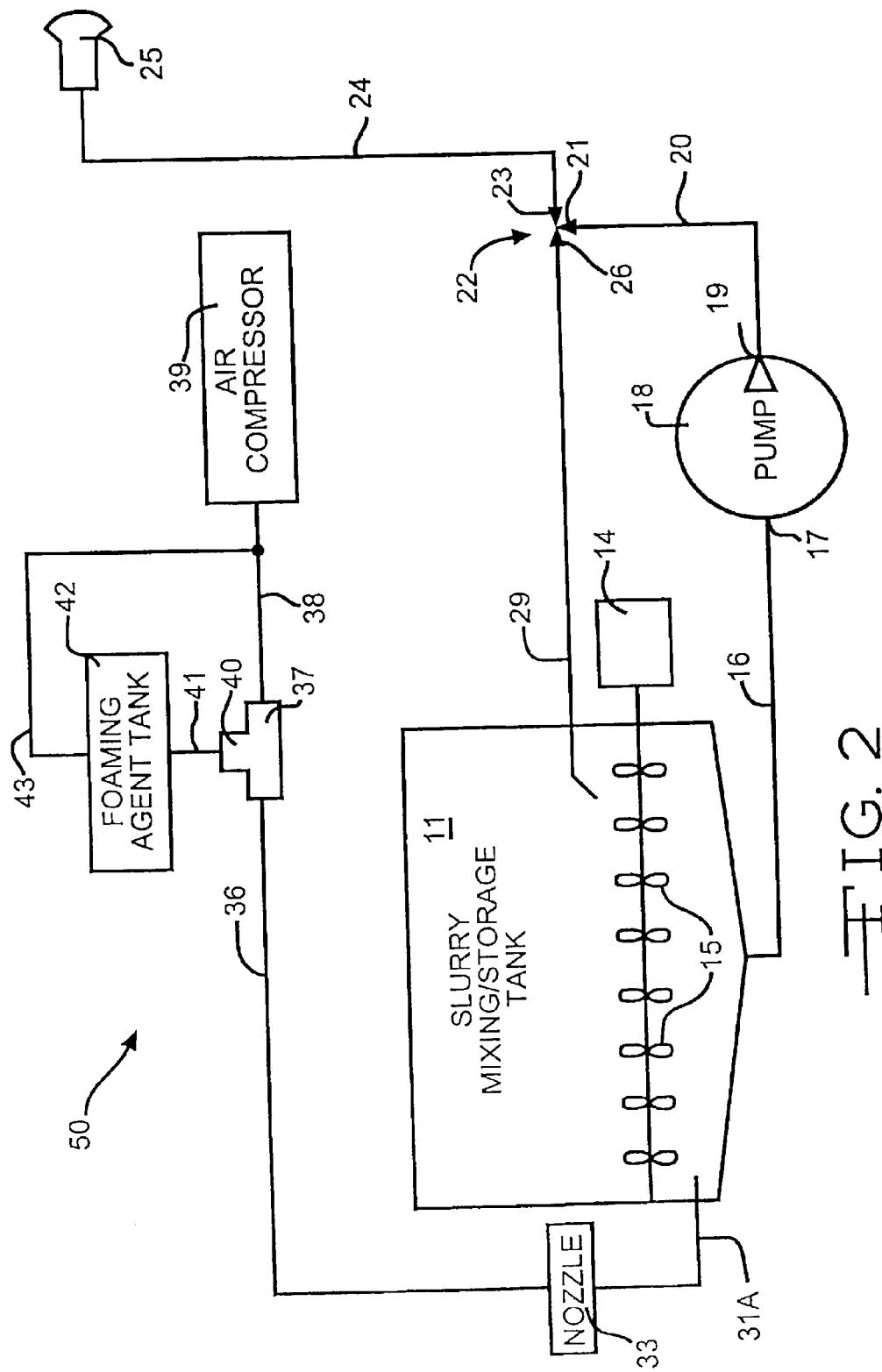
FIG. 2 is a schematic diagram of a first alternate embodiment of the apparatus shown in FIG. 1.

A second embodiment of the apparatus is shown at 50 in FIG. 2. The second embodiment 50 differs from the apparatus 10 shown in FIG. 1 in that a foam discharge line 31A supplies the foam directly into the tank 11 in close proximity to the mixing paddles 15. Accordingly, the first injection fitting 28 shown in FIG. 1 has been eliminated form the second embodiment 50. The other components of the second embodiment 50 which are similar to the components shown in FIG. 1 are numbered the same.

Figure 3:
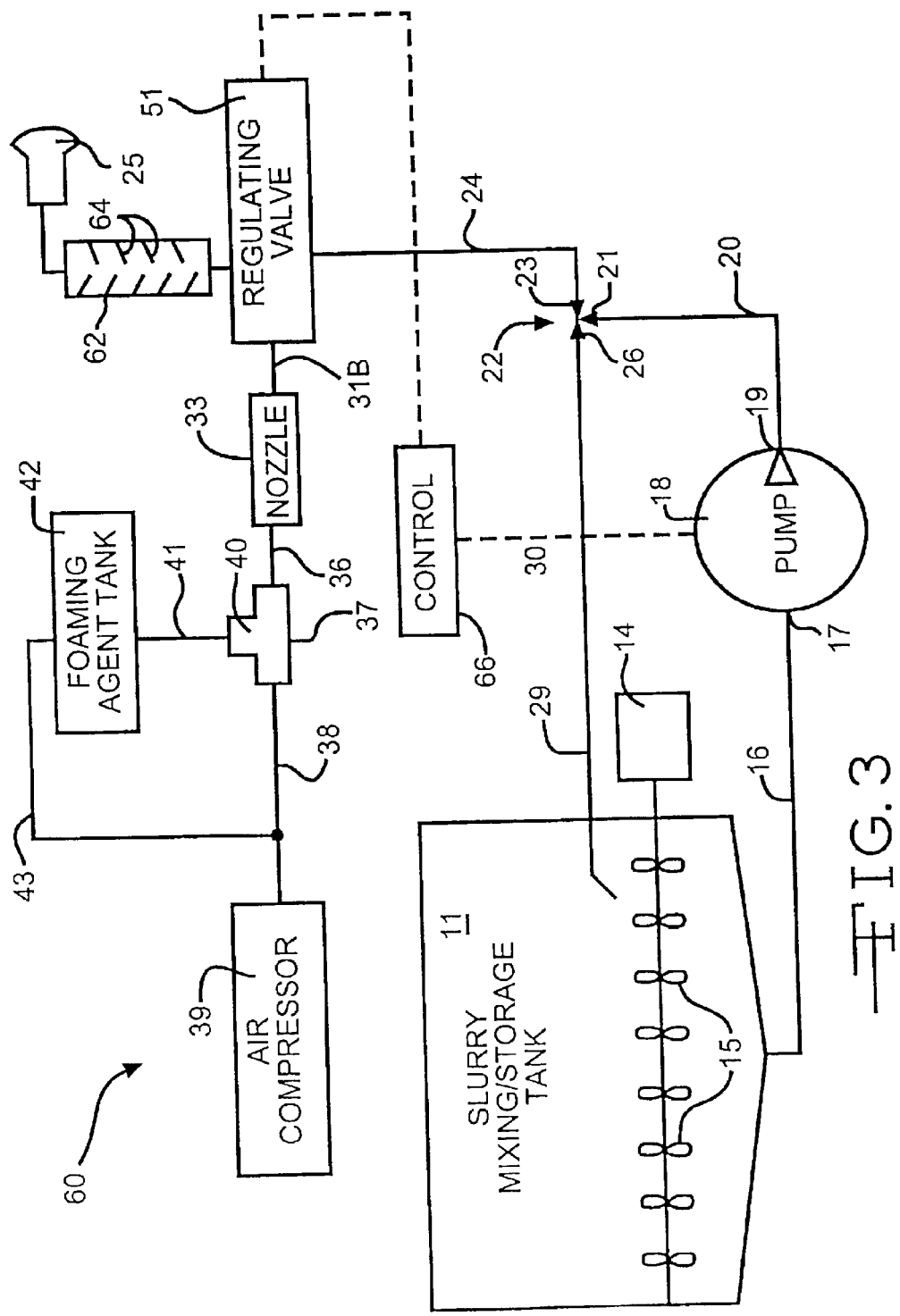
FIG. 3 is a schematic diagram of a second alternate embodiment of the apparatus shown in FIG. 1.

A third embodiment of the apparatus is shown at 60 in FIG. 3. The third embodiment 60 differs from the previously described apparatuses 10 and 50 in that a foam discharge line 31B supplies the foam to a regulating valve 51 which is inserted into the discharge line 24 between the recirculation valve 22 and the spray cannon 25. The regulating valve 51 injects the foam into the stream of 10 slurry flowing through the discharge line 24. Accordingly, the first injection fitting 28 shown in FIG. 1 has been eliminated from the third embodiment 60. The regulating valve 51 is adjusted to inject a sufficient quantity of foam to produce the desired density for the foamed slurry. A blending chamber 62 having a plurality of mixing blades 64 is connected between the valve 51 and the spray cannon 25 to ensure the foam and slurry are thoroughly mixed before spraying. In addition, a control 66 is provided to automatically adjust the valve 51 and/or the speed of the pump 18 to achieve the desired foaming of the slurry. The other components of the third embodiment 60 which are similar to the components shown in FIG. 1 are numbered the same.

As described in the above tables, the density of the foam layer depends upon the degree to which the slurry has been foamed. From one quart to two gallons of foaming agent are added to the composition for every 100 gallons of water. The amount of foaming agent added to the mixture determines the density of the foamed slurry.

The thickness of the foam layer covering depends upon the amount of foamed slurry sprayed onto the surface being coated. A foam layer of one eighth to one quarter inch thick has been found to form a successful cover having a thickness of one sixteenth to one eighth inch thick after drying. The cover takes approximately one hour to dry at an ambient temperature of 70° F. Drying occurs faster at a warmer ambient temperature and slower with a lower ambient temperature. However, the sprayed foam will function as a cover even when not dry as the polymer matrix binds together the ingredients.

The amount of bulking/setting agent included in the foamed slurry provides a cover lifetime of up to six months to a year, after which the cover breaks up and biodegrades. The cover resists cracking, even in temperatures in excess of 100° F. The cover lifetime will vary with the environment. Exposure to severe weather causes the shorter lifetime of approximately six months while exposure to mild environments typically extends the cover lifetime to the upper value of approximately one year.

As described above, the foamed slurry is continuously agitated by the mixer 14 prior to application. Furthermore, the foamed slurry should be applied immediately due to the limited time available before the slurry sets up and becomes unpumpable. A 200 gallon flush tank containing water (not shown) is typically included with the apparatus 10 to flush the equipment after the cover is applied. Since the cover is not affected by additional water after application, the flushing can be carried out by spraying flushed material onto the sprayed area.

As an alternative to the above described spray cannon 25, the foamed slurry can be applied by using a spreader bar equipped with spray jets.

While the above description has included a foaming agent, for an extremely hard tough surface coat, a minimum or no foaming agent is added, with no change in setting time. When no foaming agent is used, a surfactant is included to assure a uniform application. Useful surfactants include biodegradable non-ionic materials such as ethoxylated nonyl phenol (6 mole adduct) that is both water and oil soluble. A suitable non-ionic surfactant is N-60 available from Tag Chemical, as previously mentioned. For hydroseeding applications, seed and fertilizer can be added to the slurry to provide a plant covering to retain the soil after the covering biodegrades.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A landfill cover layer formed by a foaming composition comprising:

(a) a foaming agent, (b) a bulking material comprising a clay, the clay being water absorbent, and the clay comprising crystalline, finely divided earthy particles having a particle size within the range of 60 to 325 mesh, and (c) a water soluble polymer, the composition when mixed with an aqueous carrier forming a foamed sprayable aqueous slurry suitable for providing a cover layer over a selected landfill material.

2. The composition defined in claim 1 additionally comprising a fibrous material.

* * * * *